United States Patent Office 3,366,542
Patented Jan. 30, 1968

3,366,542
PHARMACEUTICAL PREPARATIONS CONTAINING γ-AMINO-β-(3:4-CHLOROPHENYL)-BUTYRIC ACID
Heinrich Keberle, Basel, and Johann Werner Faigle, Riehen, Switzerland, assignors to Ciba Corporation, New York, N.Y., a corporation of Delaware
No Drawing. Continuation-in-part of application Ser. No. 377,113, June 22, 1964. This application Dec. 23, 1966, Ser. No. 604,115
Claims priority, application Switzerland, July 9, 1963, 8,538/63
13 Claims. (Cl. 167—65)

ABSTRACT OF THE DISCLOSURE

Pharmaceutical compositions containing the compound of the formula

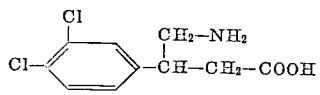

in the free form or in the form of a salt.
Use: central nervous system inhibiting agents.

---

This is a continuation-in-part of our copending application Ser. No. 377,113 filed June 22, 1964.

The present invention concerns new pharmaceutical preparations containing as active constituent γ-amino-β-(3:4-dichlorophenyl)-butyric acid of the formula

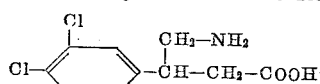

The new preparations have central nervous system inhibiting properties. Thus, for example, when tested on mice, cats, rabbits and dogs they inhibit the activity of neurons involved in motor control. They can, therefore, be used as medicaments inhibiting the central nervous system, such as muscle relaxants.

The manufacture of the γ-amino-β-(3:4-dichlorophenyl)-butyric acid has been described by D. K. Genge et al. J. Indian Chem. Soc. 37, p. 429 [1960], but no report concerning the activity of this compound has been published to date.

The new preparations may contain the active constituent in the free form or in the form of its salts which are likewise included in the present invention. As salts there are suitable those with bases, especially with therapeutically acceptable bases, for example with organic amines or with metals, such as alkali metals or alkaline earth metals, for example sodium, potassium or magnesium. Acid addition salts, especially those which are therapeutically acceptable, are likewise suitable. As such acids there may be mentioned, for example: Hydrohalic, sulphuric and phosphoric acids, nitric and perchloric acid; aliphatic, alicyclic, aromatic or heterocyclic carboxylic or sulphonic acids, such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicyclic or para-aminosalicyclic, embonic, methanesulphonic, ethanesulphonic, hydroxyethanesulphonic, ethylenesulphonic acid; halogenobenzenesulphonic, toluenesulphonic, naphthalenesulphonic acids or sulphanilic acid; methionine, tryptophan, lysine or arginine. The free aminoacid is converted into its salts in the known manner. In view of the close relationship between the aminoacid in the free form and in the form of its salts, whenever the free aminoacid is mentioned above or hereinafter, the salts are likewise concerned wherever this applies.

The new preparations are manufactured in the known manner by admixing the active constituent with a suitable excipient. Suitable excipients are organic or inorganic, solid or liquid substances that lend themselves well to enteral or parenteral administration, more especially such as do not react with the active constituent, for example water, gelatine, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragees, suppositories or capsules, or in liquid form solutions (e.g. elixirs, syrups etc.), suspensions or emulsions. They may be sterilised and/or may contain assistants such as preservatives, stabilisers, wetting agents or emulsifiers, solution promoters, salts for regulating the osmotic pressure or buffers. They may also contain further therapeutically useful substances.

The pharmaceutical preparations for enteral, for example oral or rectal administration to a host contain with advantage about 1–60% of active principle or about 1 mg. to 1 g., more especially 10 mg. to 0.5 g., of active principle per unit dose. Those for parenteral application contain about 0.1–20% of active principle or 0.3 mg. to 0.3 g., preferably 5 mg. to 150 mg., of active principle per unit dose.

The amount of excipient to be used may vary within wide limits; it depends mainly on the route of administration.

The daily dose depends on the route of administration and on the requirements of the individual host.

The following examples illustrate the invention without restricting its scope thereto.

Example 1

Tablets, containing 100 mg. of the active compound, may be prepared, for example, from the following ingredients:

| | Mg. |
|---|---|
| γ-Amino-β-(3:4-dichlorophenyl)-butyric acid | 100 |
| Lactose | 95 |
| Wheat starch | 54 |
| Gelatine | 6 |
| Arrowroot | 24 |
| Stearic acid | 6 |
| Talcum | 15 |
| | 300 |

*Preparation of the tablets.*—γ-Amino-β-(3:4-dichlorophenyl)-butyric acid, lactose and wheat starch are mixed homogeneously and pressed through a 0.5 mm. mesh sieve. Gelatine is dissolved in 10 times its own weight of water; the powder mixture is moistened with this solution and kneaded until a plastic mass has formed which is pressed through a 3 mm. mesh sieve, dried at 45° C. and then sifted through a 1.5 mm. mesh sieve. The granulate obtained in this manner is mixed with finely sifted arrowroot, stearic acid and talcum and then moulded in the usual manner into tablets of 300 mg. weight and 9 mm. diameter.

Example 2

Ampoules are made which contain γ-amino-β-(3,4-dichlorophenyl)-butyric acid and have the following compositions:

| | Mg. per ampoule |
|---|---|
| γ-Amino-β-(3,4-dichlorophenyl)-butyric acid | 2.0 |
| Mannitol | 45.4 |

N-hydrochloric acid, q.s. to attain pH 4 distilled water to make up 1.0 ml.

*Preparation.*—In distilled water which has been boiled and, while cooling, treated with gaseous nitrogen, γ-amino-β-(3,4-dichlorophenyl)-butyric acid and mannitol are dissolved with stirring at 50° C. The resulting solution is given a pH of 4 with N-hydrochloric acid, and distilled water is added until 1 ml. of the injection solution contains 2 mg. of γ-amino-β-(3,4-dichlorophenyl)-butyric acid and 45.4 mg. of mannitol. The solution is filtered and filled into ampoules in the usual manner. The ampoules are sealed by heat welding and sterilized at 220° C. for 20 minutes.

What is claimed is:

1. A pharmaceutical preparation containing a member selected from the group consisting of γ-amino-β-(3,4-dichlorophenyl)-butyric acid and its therapeuticaly acceptable salts as active ingredient, said pharmaceutical preparation being selected from consisting of
    (a) a pharmaceutical preparation for enteral application in the form of a member selected from the group consisting of tablets, capsules, suppositories and dragees, comprising essentially about 1 mg. to 1 g. of the active ingredient per dosage unit and a solid inert pharmaceutical carrier,
    (b) a pharmaceutical preparation for enteral application in the form of a member selected from the group consisting of syrups and elixirs, comprising essentially about 1 mg. to 1 g. of the active ingredient per dosage unit and a liquid inert pharmaceutical carrier, and
    (c) a pharmaceutical preparation for parenteral application containing about 0.3 mg. to 0.3 g. of the active ingredient per dosage unit in a sterile parenteral vehicle.

2. A pharmaceutical preparation as claimed in claim 1 for enteral application in the form of a member selected from the group consisting of tablets, capsules, suppositories and dragees, comprising essentially about 1 mg. to 1 g. of the active ingredient per dosage unit and a solid pharmaceutical carrier.

3. A pharmaceutical preparation as claimed in claim 2, containing 10 mg. to 0.5 g. of the active ingredient per dosage unit.

4. A pharmaceutical composition as claimed in claim 2, wherein the active ingredient is the γ-amino-β-(3,4-dichlorophenyl)-butyric acid in the free form.

5. A pharmaceutical composition as claimed in claim 3, wherein the active ingredient is the γ-amino-β-(3,4-dichlorophenyl)-butyric acid in the free form.

6. A pharmaceutical preparation as claimed in claim 1 for enteral application in the form of a member selected from the group consisting of syrups and elixirs comprising essentially about 1 mg. to 1 g. of the active ingredient per dosage unit and a liquid inert pharmaceutical carrier.

7. A pharmaceutical preparation for enteral application according to claim 6, containing 10 mg. to 0.5 g. of the active ingredient per dosage unit.

8. A pharmaceutical composition as claimed in claim 6, wherein the active ingredient is the γ-amino-β-(3,4-dichlorophenyl)-butyric acid in the free form.

9. A pharmaceutical composition as claimed in claim 7, wherein the active ingredient is the γ-amino-β-(3,4-dichlorophenyl)butyric acid in the free form.

10. A pharmaceutical preparation for parenteral application as claimed in claim 1, containing about 0.3 mg. to 0.3 g. of the active ingredient per dosage unit in a sterile parenteral vehicle.

11. A pharmaceutical preparation for parenteral application as claimed in claim 10, containing 5 mg. to 150 mg. of the active ingredient per dosage unit.

12. A pharmaceutical composition as claimed in claim 10, wherein the active ingredient is the γ-amino-β-(3,4-dichlorophenyl)-butyric acid in the free form.

13. A pharmaceutical composition as claimed in claim 11, wherein the active ingredient is the γ-amino-β-(3,4-dichlorophenyl)-butyric acid in the free form.

References Cited

Derwent Belgian Patent Report, 1965, No. 1/65, No. 650158, Jan. 22, 1965 (OP1 2–8 January 1965).

ALBERT T. MEYERS, *Primary Examiner.*

S. FRIEDMAN, *Assistant Examiner.*